United States Patent [19]

Hensolt et al.

[11] 4,282,065

[45] Aug. 4, 1981

[54] FUEL ASSEMBLY FOR GAS-COOLED NUCLEAR REACTORS

[75] Inventors: Theodor Hensolt, Nuremberg; Peter Rau, Mittelehrenbach, both of Fed. Rep. of Germany

[73] Assignee: Kraftwerk Union Aktiengesellschaft, Mülheim, Fed. Rep. of Germany

[21] Appl. No.: 970,454

[22] Filed: Dec. 18, 1978

[30] Foreign Application Priority Data

Dec. 19, 1977 [DE] Fed. Rep. of Germany ....... 2756667

[51] Int. Cl.$^3$ .............................................. G21C 3/02
[52] U.S. Cl. ........................................ 176/78; 176/76
[58] Field of Search ....................... 176/37, 50, 61, 68, 176/76, 78

[56] References Cited

U.S. PATENT DOCUMENTS

| | | | |
|---|---|---|---|
| 3,660,233 | 5/1972 | Dalke et al. | 176/78 X |
| 3,971,575 | 7/1976 | Lesham et al. | 176/78 X |
| 4,036,692 | 7/1977 | Walton | 176/78 X |
| 4,077,839 | 3/1978 | Peehs et al. | |
| 4,078,967 | 3/1978 | Anthony | 176/78 X |
| 4,124,443 | 11/1978 | Bezold | 176/78 X |
| 4,135,971 | 1/1979 | Calvin | 176/50 |
| 4,139,315 | 2/1979 | Levy et al. | 176/78 X |
| 4,164,443 | 8/1979 | Gibbons et al. | 176/50 |

FOREIGN PATENT DOCUMENTS 826228 12/1959 United Kingdom ..................... 176/76

Primary Examiner—Peter A. Nelson
Attorney, Agent, or Firm—Herbert L. Lerner

[57] ABSTRACT

In a fuel assembly for gas-cooled nuclear reactors, having a plurality of fuel rods fastened to a mounting plate formed with through bores serving as passageways for a coolant, the fuel rods having respective perforated end caps by which the fuel rods are connected to a fission-gas exhaust system, the end caps being formed with a respective external thread and being threadedly secured thereby in the mounting plate and simultaneously connected to the fission-gas exhaust system through channels formed in the mounting plate, the mounting plate and the end caps having surfaces formed thereon having a residual roughness of from 4 to 16 microns and being sealingly pressable against one another by the threaded connection between the end caps and the mounting plate, includes a threaded sleeve serving as means for threadedly securing the respective end caps to the mounting plate, the threaded sleeve being provided with means for gripping the sleeve by a tool and being formed with an internal thread in threaded engagement with the external thread of the respective end caps and an external thread in threaded engagement with a corresponding internal thread formed in the mounting plate, the external thread of the threaded sleeve having a greater pitch than the internal thread thereof.

3 Claims, 2 Drawing Figures

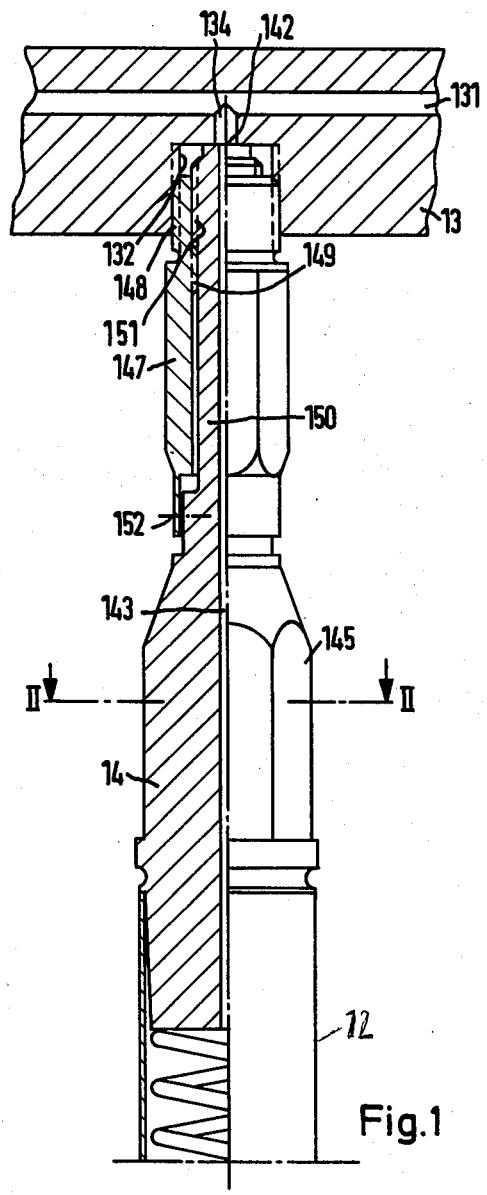
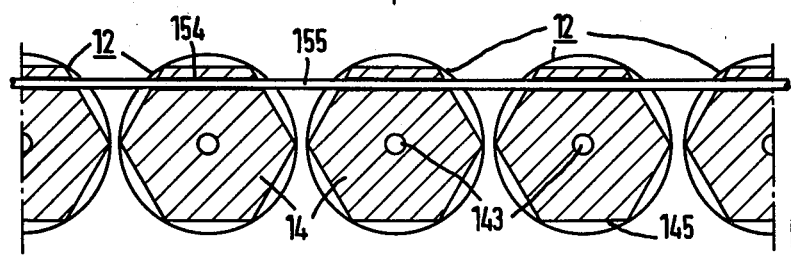

FUEL ASSEMBLY FOR GAS-COOLED NUCLEAR REACTORS

The invention relates to a fuel assembly for gas-cooled nuclear reactors of the type known from U.S. Pat. No. 4,077,839, assigned to the same assignee as that of the instant application and, more particularly, to such a fuel assembly having a plurality of fuel rods fastened to a mounting plate formed with throughbores serving as passageways for a coolant, the fuel rods having respective perforated end caps by which the fuel rods are connected to a fission-gas exhaust system, the end caps being formed with a respective external thread and being threadedly secured thereby in the mounting plate and simultaneously connected to the fission-gas exhaust system through channels formed in the mounting plate, the mounting plate and the end caps having surfaces formed thereon having a residual roughness of from 4 to 16 microns and being sealingly pressable against one another by the threaded connection between the end caps and the mounting plate. This type of fastening of ventilated fuel rods to a rod support or mounting plate of a fuel assembly has proven to be especially good for fuel rods with casing tubes having no spacer elements, the insertion of such fuel rods requiring no specific rotary angle orientation. It has been found, in the interim, however, that it is advantageous to provide posts or helical ribs on the casing tubes for the mutual spacing of the fuel rods, the function of the posts or helical ribs being assured only if the fuel rods are inserted and secured with corresponding mutual rotary-angle orientation in the composite fuel assembly.

The form of fastening disclosed in the aforementioned U.S. Pat. No. 4,077,839 was only conditionally useful for fuel rods of the foregoing type.

It is accordingly an object of the invention to provide a fuel assembly for gas-cooled nuclear reactors which has an improved means for fastening the fuel rods to the mounting plate which, on the one hand, ensures the desired surface sealing of the fuel rods with respect to the rod mounting plate and, on the other hand, also affords adjustment of the desired rotary-angle orientation of the individual fuel rods without difficulty as they are being sealed with the mounting plate.

With the foregoing and other objects in view, there is provided a fuel assembly for gas-cooled nuclear reactors of the type mentioned hereinbefore and disclosed in U.S. Pat. No. 4,077,839 wherein means for threadedly securing the respective end caps to the mounting plate include a threaded sleeve that is provided with means for gripping the sleeve by a tool, the threaded sleeve being formed with an internal thread in threaded engagement with the external thread of the respective end caps and an external thread in threaded engagement with a corresponding internal thread formed in the mounting plate, the external thread of the threaded sleeve having a greater pitch than the internal thread thereof.

Other features which are considered as characteristic for the invention are set forth in the appended claims.

Although the invention is illustrated and described herein as embodied in fuel assembly for gas-cooled nuclear reactors, it is nevertheless not intended to be limited to the details shown, since various modification and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1 is a fragmentary longitudinal view, partly in section, of a fuel assembly for a gas-cooled nuclear reactor showing a fuel rod thereof and a mounting therefor in a rod holding plate; and FIG. 2 is a cross-sectional view of FIG. 1 and of a series of fuel rods adjacent thereto and further showing means for securing the fuel rods in common against being unscrewed.

Referring now to FIG. 1 of the drawing, there is shown a fuel rod 12 fastened in a rod holding plate 13. The fuel rod 12 is provided with an end cap 14 having an outer hexagonal surface 145 as a tool gripping device and being formed centrally with a bore 143 for removal or discharge of fission gas. This bore 143 is aligned with a bore 134 formed in the rod holding plate 13 as a connection or inlet to a fission-gas removal or discharge system 131. The fuel rod 12 or the fuel-rod end cap 14 is sealed with the rod holding plate 13 by means of an end face 142. To fasten the end cap 14 in the rod holding plate 13, the latter is formed with a threaded sleeve 147 formed with an internal thread which threadedly engages an external thread 151 formed on a rod-shaped elongation or extension 150 of the end cap 14. The external thread 148 of the sleeve 147 is screwed into the threaded bore 132 of the rod holding plate 13.

Since the external thread 148 has a greater pitch than the internal thread 149, the suitable unit pressure of the end face 142 is attained by twisting or turning the threaded sleeve 147 through the fuel rod 12 which is secured by means of a torque wrench or spanner formed with the aforementioned hexagonal surface 145. Reversed turning or twisting of the threaded sleeve 147 loosenes or releases the connection between the fuel rod and the rod holding plate 13.

The threaded sleeve 147 and the components engaging or mating therewith can, however, also be so constructed that the external and internal thread have an opposite sense of direction of rotation. This type of construction has the advantage that the fuel rod to be fastened can be inserted end first into the rotationally oriented position thereof and can remain in that position. This is of importance especially for fuel rods with helical spacing fins.

For the protection or security of the sealed condition of the fuel rod mounting, the threaded sleeve 147 is fixed to the end cap 14 or to the elongation or extension 150 thereof by a spot weld 152 or equivalent fastening means.

As a protection against rotation and, simultaneously, to fix or establish the required rotary-angle position of the individual fuel rods 12 in the composite fuel assembly, the end caps 14 are formed with a respective bore 154, as shown in FIG. 2, through which a common pin 155 is insertable and thereby ensures continued maintenance of the given rotary orientation of the fuel rods. These bores 154 are obviously set or formed in a manner that they assure the required positioning of non-illustrated parts of spacing ribs for non-illustrated spacers between the individual fuel rods of which the end caps 14 are shown in FIG. 2.

Finally, it should again be emphasized that the pitch of the external thread on the sleeve 147 must be greater than that of the internal thread, the transmission ratio for the adjustment of the sealing pressure being predeterminable through the value of the phase difference of the threads.

We claim:

1. A fuel assembly for gas-cooled nuclear reactors, having a plurality of fuel rods fastened to a mounting plate formed with throughbores serving as passageways for a coolant, the fuel rods having respective perforated end caps by which the fuel rods are connected to a fission-gas exhaust system, the end caps being formed with a respective external thread and being threadedly secured thereby in the mounting plate and simultaneously connected to the fission-gas exhaust system through channels formed in the mounting plate, the mounting plate and the end caps having surfaces formed thereon having a residual roughness of from 4 to 16 microns and being sealingly pressable against one another by the threaded connection between the end caps and the mounting plate, comprising a threaded sleeve serving as means for threadedly securing the respective end caps to the mounting plate, said threaded sleeve being provided with means for gripping the sleeve by a tool and being formed with an internal thread in threaded engagement with the external thread of the respective end caps and an external thread in threaded engagement with a corresponding internal thread formed in the mounting plate, said external thread of said threaded sleeve having a greater pitch than said internal thread thereof.

2. Fuel assembly according to claim 1 wherein said external thread of said threaded sleeve has a rotary sense opposite that of said internal thread thereof.

3. Fuel assembly according to claim 1 or 2 including means for protecting the fuel rods against rotation comprising a straight pin received in bores formed in the end caps and aligned in respective rows of the fuel rods, said bores extending laterally and perpendicularly to the respective axes of the end caps.

* * * * *